(12) United States Patent
Gendelev et al.

(10) Patent No.: US 10,115,108 B1
(45) Date of Patent: Oct. 30, 2018

(54) RENDERING TRANSACTION DATA TO IDENTIFY FRAUD DETECTION RULE STRENGTH

(71) Applicant: EMC Corporation, Hopkinton, MA (US)

(72) Inventors: Anatoly Gendelev, Rechovot (IL); Alex Zaslavsky, Petah Tiqwa (IL); Kineret Raviv, Herzliya (IL); Eyal Kolman, Tel Aviv (IL); Alma Zohar, Ra'anana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 382 days.

(21) Appl. No.: 15/083,685

(22) Filed: Mar. 29, 2016

(51) Int. Cl.
- *G06Q 40/00* (2012.01)
- *G06Q 20/40* (2012.01)
- *G06T 11/20* (2006.01)
- *G06F 3/0482* (2013.01)

(52) U.S. Cl.
CPC ....... *G06Q 20/4016* (2013.01); *G06F 3/0482* (2013.01); *G06T 11/206* (2013.01)

(58) Field of Classification Search
CPC .......................... G06Q 20/4016; G06T 11/206
See application file for complete search history.

(56) References Cited

U.S. PATENT DOCUMENTS

| | | | |
|---|---|---|---|
| 8,572,391 B2 | 10/2013 | Golan et al. | |
| 8,627,479 B2 | 1/2014 | Wittenstein et al. | |
| 8,756,684 B2 | 6/2014 | Frantz et al. | |
| 8,781,975 B2 | 7/2014 | Bennett et al. | |
| 8,856,923 B1 * | 10/2014 | Kolman | G06Q 20/4016 380/255 |
| 9,160,726 B1 * | 10/2015 | Kaufman | H04L 63/08 |
| 2017/0140382 A1 * | 5/2017 | Chari | G06Q 20/4016 |
| 2017/0262852 A1 * | 9/2017 | Florimond | G06Q 20/4016 |

\* cited by examiner

*Primary Examiner* — Olabode Akintola
(74) *Attorney, Agent, or Firm* — BainwoodHuang (57) ABSTRACT

Techniques of identifying fraud detection rule strength involve varying the rendering of a graph from transaction data. Along these lines, a rules server computer provides a general graph from a group of transaction entries defining a group of fraudulent and authentic transactions on an electronic display. A user defines selection criteria that the rules server computer applies to the group of transaction entries to generate a subgroup of transaction entries. From the subgroup of transaction entries, the rules server computer provides a focused graph on the electronic display from the subgroup of transaction entries defining a subgroup of the group of fraudulent and authentic transactions. A ratio of the number of fraudulent transactions to the number of authentic transactions represented in the focused graph identifies the strength of the selection criteria for use in a fraud detection rule.

20 Claims, 5 Drawing Sheets

RENDERING TRANSACTION DATA TO IDENTIFY FRAUD DETECTION RULE STRENGTH

BACKGROUND

Fraud detection systems determine whether a transaction is fraudulent based on authentication factors presented in a request to process the transaction. Examples of authentication factors include a time of day at which the transaction request was submitted, an amount of money involved in the transaction, and a country in which the transaction would take place. Fraud detection systems may trigger actions such as flagging the transaction for further investigation, rejecting the transaction, and so on in response to particular authentication factors having certain values or existing within certain ranges. By performing these actions, the fraud detection systems may prevent a fraudulent transaction from being processed.

The particular authentication factors and those respective values or ranges that trigger actions define fraud detection policies that govern how fraud detection systems operate. An example of a fraud detection policy used in a fraud detection system takes the form of a set of rules such as "IF amount >$500 AND country='Belgium' THEN flag for further investigation." In this way, any transaction request having transaction factors that satisfy such a rule will be flagged for further investigation. Such a policy thereby dictates how the fraud detection system reacts to the authentication factors presented in each request.

SUMMARY

A fraud detection analyst is a person who configures a fraud detection policy to flag as many fraudulent transactions as possible. In configuring fraud detection policies, analysts typically rely on their experience in dealing with prior transactions to identify those ranges of authentication factors that should trigger some action. For example, suppose that an analyst has noticed that transactions originating in Moldova and involving more than $1000 tend to be fraudulent. The analyst might then manually set a policy to reject transactions in response to receiving requests to process transactions from Moldova involving more than $1000. Such a rule may indeed prevent many fraudulent transactions from being processed.

Unfortunately, there are deficiencies with the above-described conventional approach to defining fraud detection policies. For example, policies relying on analysts' experience tend to have excessive false positives, e.g., rejecting transaction requests when such requests were made by authorized users. Along these lines, suppose that an analyst determines the policy as above in which all requests to process transactions originating in Moldova and involving more than $1000 are to be rejected. While such a policy may catch a number of fraudulent requests, the policy may also reject a number of authentic requests as well. Such rejection of authentic requests results in inconvenience for the genuine user and possible loss of revenue.

In contrast with the above-described conventional approach of defining fraud detection policies that results in false positives, improved techniques involve varying the rendering of a graph from transaction data to identify fraud detection rule strength. Along these lines, a rules server computer provides a general graph from a group of transaction entries defining a group of fraudulent and authentic transactions on an electronic display. A user defines selection criteria that the rules server computer applies to the group of transaction entries to generate a subgroup of transaction entries. From the subgroup of transaction entries, the rules server computer provides a focused graph on the electronic display from the subgroup of transaction entries defining a subgroup of the group of fraudulent and authentic transactions. A ratio of the number of fraudulent transactions to the number of authentic transactions represented in the focused graph (e.g., a graph depicted by displaying targeted subsets of the fraudulent transactions and the authentic transactions in different line styles or colors) identifies the strength of the selection criteria for use in a fraud detection rule.

Advantageously, the improved techniques provide fraud detection rules that have fewer false positives. Along these lines, consider a situation in which a user may select a portion of a graph that represents a particular interval of an authentication factor, i.e., transactions in which money is transferred to a payee account whose age is less than 3 days. The user may have selected the particular interval because it appears on the display that all of the transactions having a payee account age within this interval are all fraudulent. In this way, the user may set a rule that flags such transactions. A rule so constructed should be at low risk of inducing false positives.

One embodiment of the improved techniques is directed to a method of varying how processing circuitry renders transaction data to identify fraud detection rule strength. The method includes, from a group of transaction entries and by processing circuitry, providing a general graph on an electronic display of a user, the group of transaction entries defining a group of transactions. Each transaction entry includes (i) a set of transaction details identifying aspects of a respective transaction and (ii) a fraud indicator indicating whether that respective transaction was fraudulent. The general graph representing the respective transaction is defined by each transaction entry of the group of transaction entries by (i) using a first graph style when the fraud indicator of that transaction entry indicates that the respective transaction is fraudulent and (ii) using a second graph style when the fraud indicator of that transaction entry indicates that the respective transaction is authentic. The method also includes, after providing the general graph on the electronic display of the user and by the processing circuitry, applying selection criteria to the group of transaction entries to generate a subgroup of transaction entries from the group of transaction entries, the subgroup having fewer transaction entries than the group of transaction entries. The method further includes, from the subgroup of transaction entries and by the processing circuitry, providing a focused graph on the electronic display of the user in place of the general graph, the focused graph representing the respective transaction defined by each transaction entry of the subgroup of transaction entries by (i) using the first graph style when the fraud indicator of that transaction entry indicates that the respective transaction is fraudulent and (ii) using the second graph style when the fraud indicator of that transaction entry indicates that the respective transaction is authentic, the ratio between the number of transactions represented using the first graph style to the number of transactions represented using the second graph style identifying the strength of the selection criteria for use in a fraud detection rule.

Additionally, some embodiments are directed to an apparatus including memory and controlling circuitry constructed and arranged to carry out a method of varying how processing circuitry renders transaction data to identify fraud detection rule strength.

Further, some embodiments are directed to a computer program product having a non-transitory computer readable storage medium that stores instructions which, when executed by a computer, cause the computer to carry out the method of varying how processing circuitry renders transaction data to identify fraud detection rule strength.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of providing fraud detection rules involve varying the rendering of a graph from transaction data to identify fraud detection rule strength. Advantageously, the improved techniques provide fraud detection rules that have fewer false positives.

Figure 1:
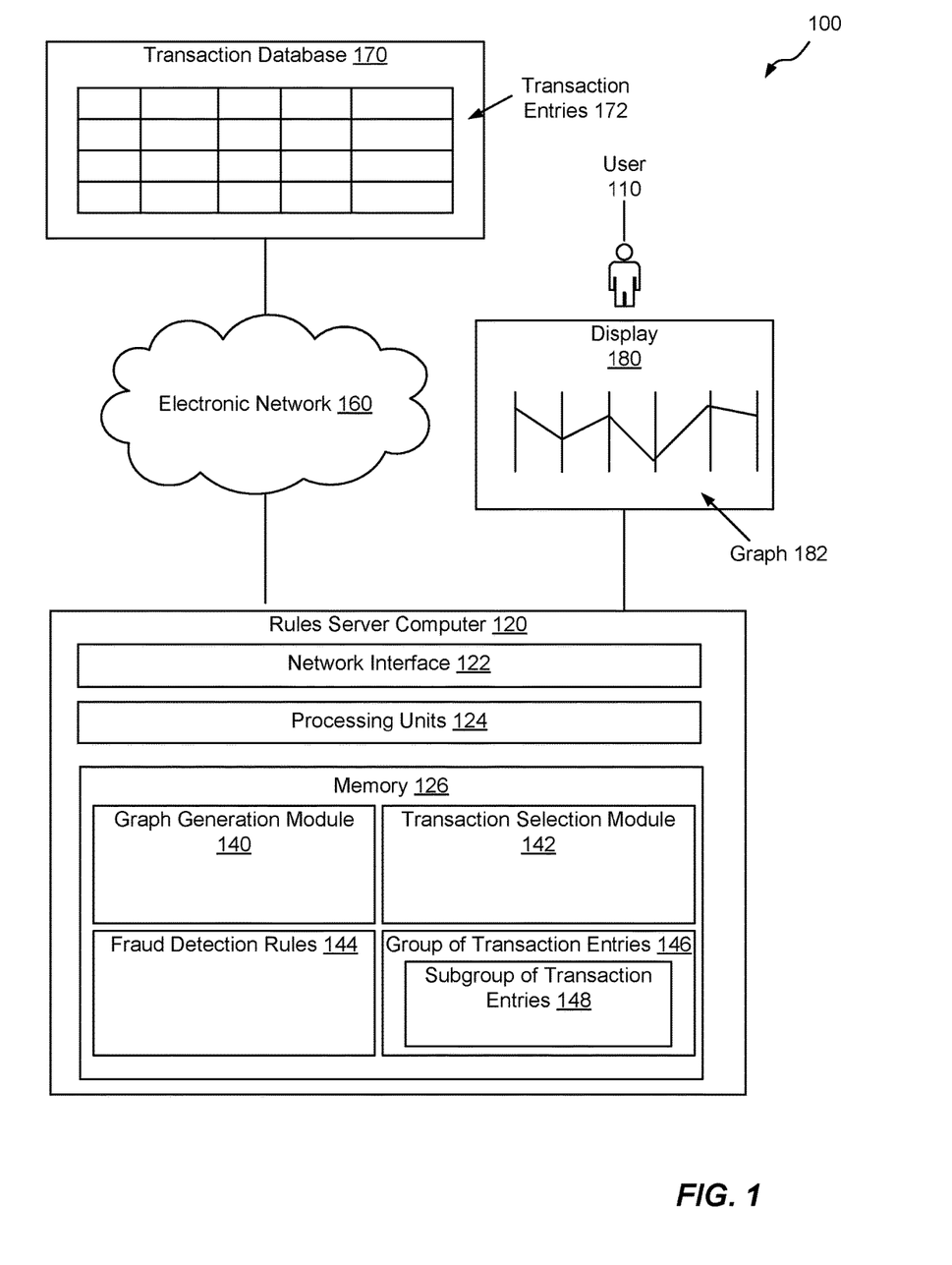
FIG. 1 is a block diagram illustrating an example electronic environment in which the improved technique can be carried out.

FIG. 1 shows an example electronic environment 100 in which embodiments of the improved techniques hereof can be practiced. Here, electronic environment 100 includes rules server computer 120, electronic network 160, and transaction database 170.

The rules server computer 120 is configured to render a graph from transaction entries obtained from the transaction database 170. As illustrated in FIG. 1, the rules server computer 120 is implemented as a computer system that is in communication with the transaction database 170 over the electronic network 160.

The rules server computer 120 is seen to include one or more network interfaces 122, a set of processing units 124, memory 126, and display 180. The network interfaces 122 include, for example, Ethernet adapters, Token Ring adapters, and the like, for converting electronic and/or optical signals received from the electronic network 160 to electronic form for use by the rules server computer 120. The set of processing units 124 include one or more processing circuits, chips and/or assemblies. The memory 126 includes both volatile memory (e.g., RAM), and non-volatile memory, such as one or more ROMs, disk drives, solid state drives, and the like. The set of processing units 124 and the memory 126 together form control circuitry, which is constructed and arranged to carry out various methods and functions as described herein.

The memory 126 includes a variety of software constructs realized in the form of executable instructions, such as a graph generation module 140 and a transaction selection module 142. When the executable instructions are run by the set of processing units 124, the set of processing units 124 are caused to carry out the operations of the software constructs. Although certain software constructs are specifically shown and described, it is understood that the memory 126 typically includes many other software constructs, which are not shown, such as an operating system, various applications, processes, and daemons, for example.

The graph generation module 140 is configured to generate a graph 182 on the display 180 from transaction entries (e.g., the group of transaction entries 146) obtained from the transaction database 170. As illustrated in FIG. 1, in some arrangements the graph 182 may take the form of a parallel coordinate plot in which each authentication factor is represented as a vertical axis spanning a range of that authentication factor. The transaction represented by a transaction entry appears as a piecewise continuous line intersecting each axis at a point corresponding to the value of the authentication factor represented by that vertical axis.

The transaction selection module 142 is configured to apply a selection criterion to the group of transaction entries 146 obtained from the transaction database 170 to produce a subgroup of transaction entries 148. The subgroup 148 has fewer entries than the group 146. For example, a selection criterion entered by the user 110 may be an authentication factor interval, e.g., transaction time between 2 AM and 5 AM. The transaction selection module 142 would then select, as the subgroup of transaction entries 148, those transaction entries of the group 146 having a transaction time between 2 AM and 5 AM.

The memory 126 is also constructed and arranged to store various data. For example, memory 126 stores fraud detection rules 144, a group of transaction entries 146, and a subgroup of the group of transaction entries 148.

The fraud detection rules 144 are logical conditions that, if satisfied by the authentication factors of a new transaction, cause the rules server computer 120 to perform some specified action. The fraud detection rules 144 are contained in a file in the memory 126.

The group of transaction entries 146 is a set of transaction entries obtained from the transaction database 170. In some arrangements, the rules server computer 120 forms the group of transaction entries 146 from transaction entries in the transaction database 170 representing transactions occurring in the previous, e.g., 24 hours, 7 days, 30 days, 60 days, 90 days, or later.

The subgroup of transaction entries 148 contains transaction entries selected from the group of transaction entries 146 based on selection criteria input into the transaction selection module 142 by the user 110.

The electronic network 160 provides network connections between the rules server computer 120 and the transaction database 170. The electronic network 160 may implement any of a variety of protocols and topologies that are in common use for communications over the Internet or other networks. Further, the electronic network 160 may include various components (e.g., cables, switches/routers, gateways/bridges, etc.) that are used in such communications.

The transaction database 170 includes a storage device that stores transaction entries 172. As shown in FIG. 1, the user database 170 is connected to the rules server computer 120 over the electronic network 160. However, in other arrangements, the user database 170 may be connected to the rules server computer 120 directly.

Each transaction entry 172 stored in the transaction database 170 includes (i) a set of transaction details identifying aspects of a respective transaction and (ii) a fraud indicator indicating whether that respective transaction was fraudulent. Examples of such transaction details include the time at which a transaction occurs, a transaction amount, a country of origin of a transaction, and so on.

It should be understood that the fraud indicator of a transaction entry 172 indicates that a respective transaction is fraudulent or authentic according to previous work done by an analyst. Along these lines, previous transactions may have been assigned a risk score by an authentication system according to certain authentication factors. As part of a feedback process, the authentication system identifies the transactions having the highest risk scores, e.g., the top 1 percentile, and sends the transaction details defining those transactions to analysts. The analysts in turn manually determine whether each of the transactions is fraudulent or authentic. It should be noted that the transactions not considered by the analysts are assumed to be authentic, as those transactions have a risk score low enough to not be of concern to the analysts.

The rules server computer 120 also includes an electronic display 180 on which the rules server computer 120 may render a graph 182 from either the group of transaction entries 146 or the subgroup of transaction entries 148. In addition, the electronic display 180 may also render a cursor controlled by the user 110 via an input device such as a mouse or a keyboard.

During example operation, the rules server computer 120 receives transaction entries 172 from the transaction server 170 over the electronic network 160 to form the group of transaction entries 146. As discussed previously, these entries 172 may consist of transaction entries representing transactions that have occurred over the past 30 days, for example.

Upon receiving a display command from the user 110, the rules server computer 120 renders a graph 182 from the group of transaction entries 146. For example, the graph 182 may be a parallel coordinate plot in which each vertical axis represents an authentication factor and each transaction is represented as a piecewise continuous line that intersects the vertical axes at points corresponding to the authentication factors in the transaction data representing that transaction.

Further, the graph 182 represents a respective transaction defined by each transaction entry of the group of transaction entries by (i) using a first graph style when the fraud indicator of that transaction entry indicates that the respective transaction is fraudulent and (ii) using a second graph style when the fraud indicator of that transaction entry indicates that the respective transaction is authentic. For example, in a parallel coordinate plot, each piecewise continuous line may be rendered in a first color and/or thickness when the respective transaction represented by that line is fraudulent. Further, each piecewise continuous line may be rendered in a second color and/or thickness when the respective transaction represented by that line is authentic.

Figure 2:
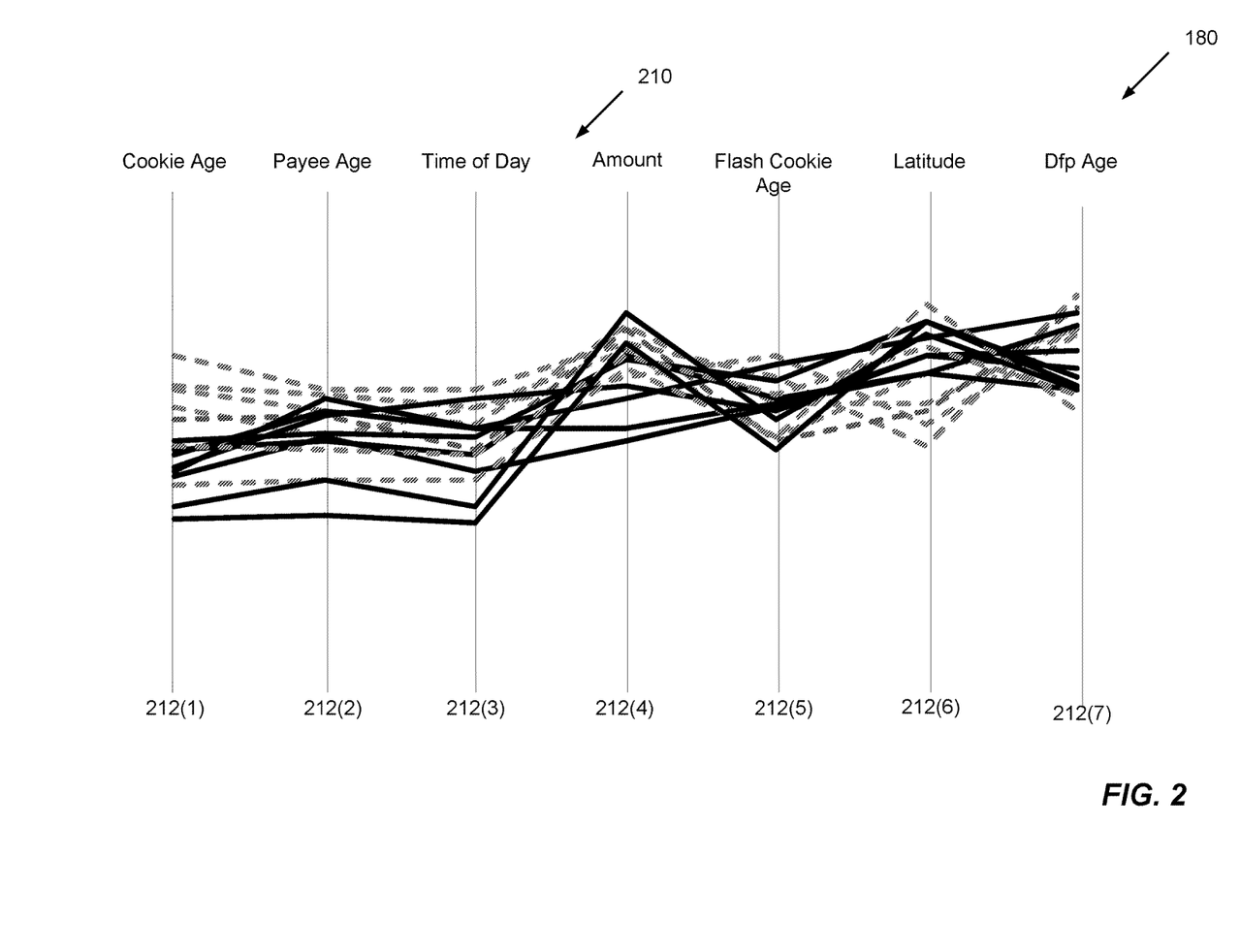
FIG. 2 is a first parallel coordinate plot of a group of transaction entries within the electronic environment shown in FIG. 1.

FIG. 2 illustrates a display 200 providing an example of such a parallel coordinate plot 210. As shown in FIG. 2, the axes 212(1 . . . 7) of the plot 210 represent the following authentication factors: cookie age, payee age, time of day, amount, flash cookie age, latitude, and Dfp age. It should be understood that the authentication factors represented in the plot 210 may be chosen at the discretion of the user 110 or some other entity. Such a user or entity may choose as many or as few authentication factors to be represented in plot 210 as desired.

The plot 210 represents the fraudulent transactions with dark, solid lines and the authentic transactions with light, dashed lines. However, in other arrangements, the plot 210 may use different colors (e.g., red and green) or different line styles (e.g., solid and dashed) to distinguish between fraudulent and authentic transactions.

The plot 210 shows the axes in an arbitrary scale. However, in some arrangements, each of the authentication factors represented in a parallel coordinate plot that takes on numerical values may be normalized to the same range, e.g., 0.0-1.0. In this way, the parallel coordinate plot may be easier to read visually.

The user 110 may analyze the plot 210 to identify regions along any of the axes where there are no authentic transactions. In the plot 210 shown in FIG. 2, such a region would have all dark, solid lines and no light, dashed lines. By identifying such a region, the user 110 may communicate a rule to the rules server computer 110 that has very little risk of producing false positives with regard to fraud detection operations on subsequent transactions.

Figure 3:
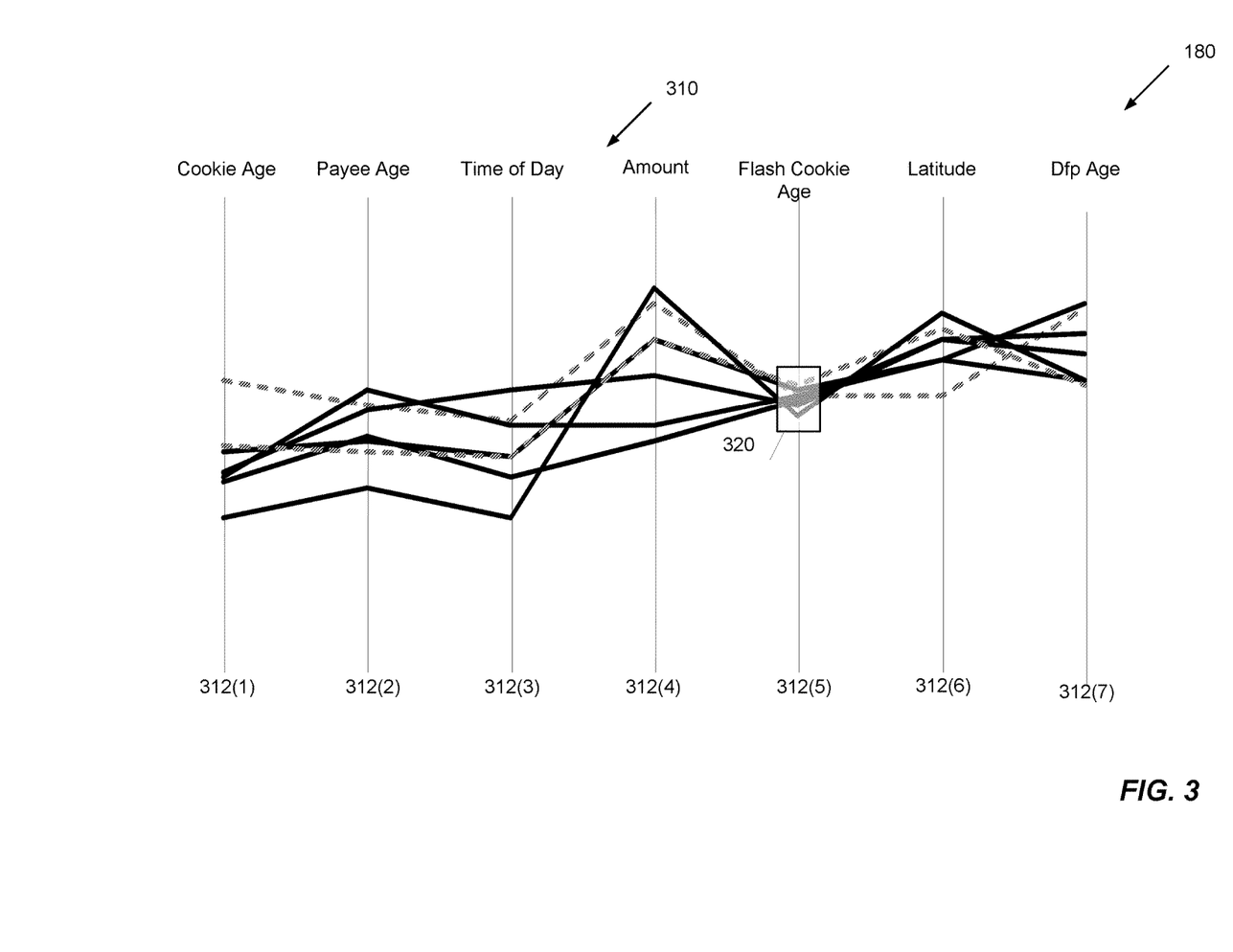
FIG. 3 is a second parallel coordinate plot of a group of transaction entries within the electronic environment shown in FIG. 1.

FIG. 3 illustrates an example identification of such a region in plot 310, which is derived from plot 210. In FIG. 3, the user 110 may identify a region by dragging a cursor along a region of an axis to produce a shaded box along that region. This region represents a range of the flash cookie age represented by that axis. In FIG. 3, that authentication factor is the "Flash cookie age."

When the user 110 produces the shaded box along the "Flash cookie age" axis, the transaction selection module 142 receives, as a selection criterion, the selected range of the authentication factor identified as "Flash cookie age." The transaction selection module 142 then filters the group of transaction entries 146 using this selection criterion to produce the subgroup of transaction entries 148. That is, the subgroup of transaction entries 148 consist of all transaction entries in the group 146 in which the online score has a value within the selected range.

Once the transaction selection module 142 produces the subgroup 148, the graph generation module 140 replaces the plot 210 with the plot 310. Whereas the plot generation module 140 produced the plot 210 from the group of transaction entries 146, the plot generation module 140 produces the plot 310 from the subgroup of transaction entries 148.

Because the subgroup 148 has fewer transaction entries than the group 146, the plot 310 will have fewer lines than the plot 210. Further, if the user 110 selected a region free of authentic transactions, then the plot 310 will also be free of authentic transactions and the selection criterion becomes a rule that has very little risk of producing false positives.

However, in general it may not be possible to find a range completely free of authentic transactions. That said, it is still worthwhile to locate regions very dense in lines representing fraudulent transactions. In this way, a rule derived from such a region may be evaluated for its effectiveness. For example, the user 110 may compute a ratio of the number of lines representing authentic transactions to the number of lines representing fraudulent transaction in the selected region. This ratio may indicate that such a rule is good enough and will still be very unlikely to produce false positives.

Furthermore, the user 110 may use the plot 310 to identify other regions that do not have authentic transactions. The result would then be a rule defined by a combination of ranges of authentication factors.

Figure 4:
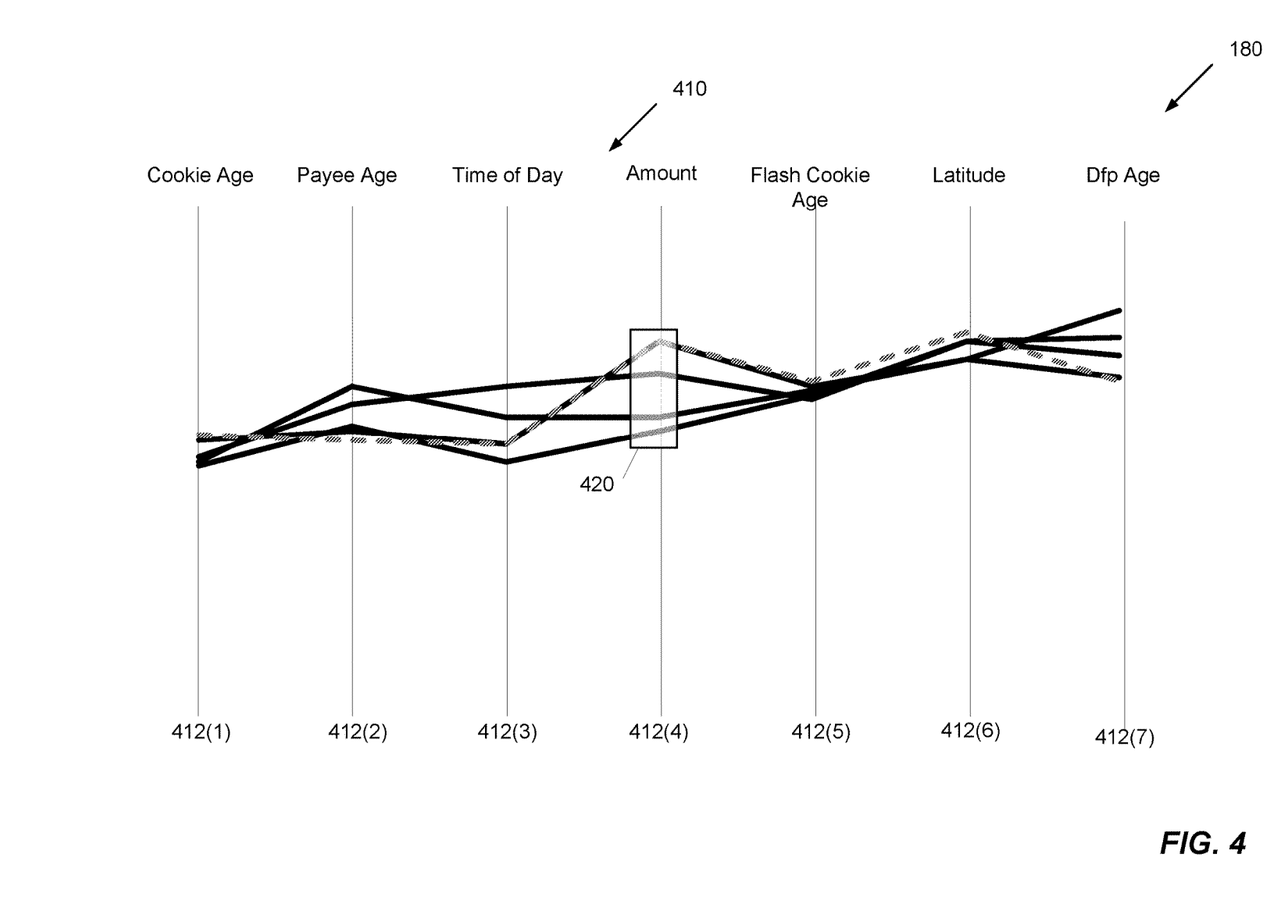
FIG. 4 is a third parallel coordinate plot of a group of transaction entries within the electronic environment shown in FIG. 1.

FIG. 4 illustrates an example identification of such an additional region in plot 410. Plot 410 is derived from plot 310 in a similar way that plot 310 was derived from plot 210. Here, region 420 is the region identified in FIG. 3 as region 320. However, plot 310 may show too many authentic transactions, i.e., light, dashed lines.

In this case, the user 110 observes that there is another dense grouping of dark, thick lines that represent fraudulent transactions at the bottom of the axis labeled "Amount." In response, the user 110 drags the cursor over a range of this axis. The transaction selection module 142 receives, as a selection criterion, the selected range of the authentication factor identified as "Amount" in addition to the already-selected range of "Flash cookie age." The transaction selection module 142 then filters the subgroup of transaction entries 148 using this selection criterion to produce another subgroup of transaction entries. Once the transaction selection module 142 produces the new subgroup, the graph generation module 140 replaces the plot 310 with the plot 410.

Again, when the ratio is sufficiently small, then the rules server computer 120 transforms the selection criteria into the fraud detection rules 144. The fraud detection rules 144 as constructed herein have a very low risk of generating false positives.

Figure 5:
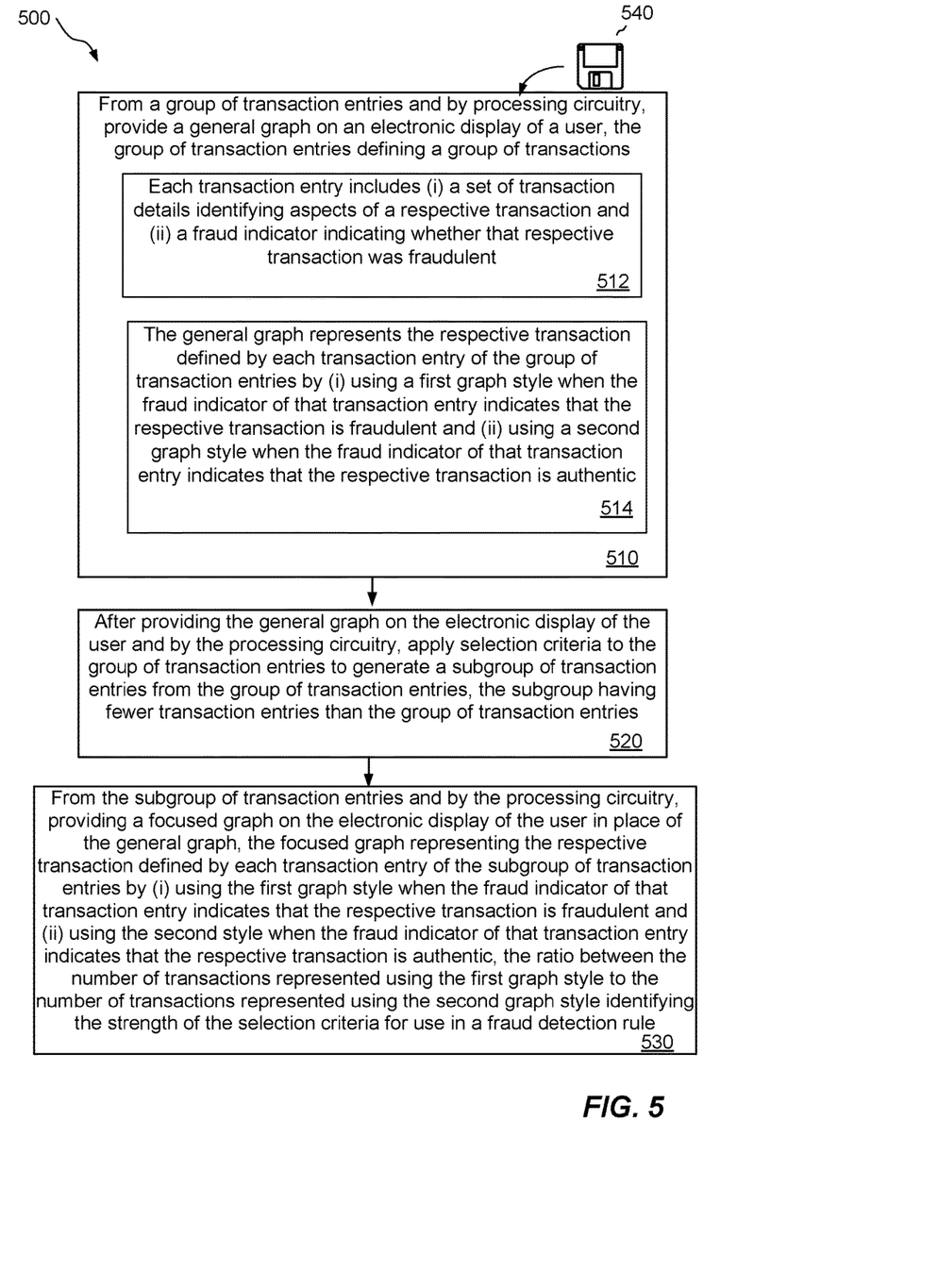
FIG. 5 is a flow chart illustrating an example method of processing the write requests within the electronic environment shown in FIG. 1.

FIG. 5 illustrates a method 500 of varying how processing circuitry renders transaction data to identify fraud detection rule strength. The method 500 may be performed by the software constructs described in connection with FIG. 1, which reside in the memory 126 of the rules server computer 120 and are run by the processing units 124.

At 510, a general graph is provided on an electronic display of a user from a group of transaction entries and by the processing units 124. Each transaction entry includes (i) a set of transaction details identifying aspects of a respective transaction and (ii) a fraud indicator indicating whether that respective transaction was fraudulent. The general graph represents the respective transaction defined by each transaction entry of the group of transaction entries by (i) using a first graph style when the fraud indicator of that transaction entry indicates that the respective transaction is fraudulent and (ii) using a second graph style when the fraud indicator of that transaction entry indicates that the respective transaction is authentic.

At 520, after providing the general graph on the electronic display of the user and by the processing circuitry, selection criteria are applied to the group of transaction entries to generate a subgroup of transaction entries from the group of transaction entries, the subgroup having fewer transaction entries than the group of transaction entries.

At 530, from the subgroup of transaction entries and by the processing circuitry, a focused graph is provided on the electronic display of the user in place of the general graph. The focused graph represents the respective transaction defined by each transaction entry of the subgroup of transaction entries by (i) using the first graph style when the fraud indicator of that transaction entry indicates that the respective transaction is fraudulent and (ii) using the second graph style when the fraud indicator of that transaction entry indicates that the respective transaction is authentic. The ratio between the number of transactions represented using the first graph style to the number of transactions represented using the second graph style identifies the strength of the selection criteria for use in a fraud detection ml e.

Improved techniques have been described for providing fraud detection rules involve varying the rendering of a graph of transaction data to identify fraud detection rule strength. Advantageously, the improved techniques provide fraud detection rules that have fewer false positives.

Having described certain embodiments, numerous alternate embodiments or variations can be made. For example, in some arrangements, rather than a parallel coordinate plot, the graph generation module 140 could provide a radar chart from the group of transaction entries. In such a case, the radar chart also provides axes for each authentication factor except that the axes are no longer parallel.

Further, in some arrangements, the authentication factors represented in a parallel coordinate plot (or other type of plot) may take on discrete values rather than the continuous ranges show in FIGS. 2, 3, and 4. In such a case, the user 110 may select one or more values of such an authentication factor instead of a range and the fraud detection rules can recognize such values.

One should appreciate that the above-described techniques are not directed to a mere abstract idea. Rather, the disclosed technique is directed to a graphical user interface shown on an electronic display used to improve the security of electronic transactions.

In some arrangements, the rules server computer 120 is implemented by a set of cores or other types of control/processing circuitry running software. In such arrangements, the software instructions can be delivered, within the rules server computer 120, in the form of a computer program product 540. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is intended to be set forth in this document.

What is claimed is:

1. A method of varying how processing circuitry renders transaction data to identify fraud detection rule strength, the method comprising:

from a group of transaction entries and by processing circuitry, providing a general graph on an electronic display of a user, the group of transaction entries defining a group of transactions, each transaction entry including (i) a set of transaction details identifying aspects of a respective transaction and (ii) a fraud indicator indicating whether that respective transaction was fraudulent, and the general graph representing the respective transaction defined by each transaction entry of the group of transaction entries by (i) using a first graph style when the fraud indicator of that transaction entry indicates that the respective transaction is fraudulent and (ii) using a second graph style when the fraud indicator of that transaction entry indicates that the respective transaction is authentic;

after providing the general graph on the electronic display of the user and by the processing circuitry, applying selection criteria to the group of transaction entries to generate a subgroup of transaction entries from the group of transaction entries, the subgroup having fewer transaction entries than the group of transaction entries; and from the subgroup of transaction entries and by the processing circuitry, providing a focused graph on the electronic display of the user in place of the general graph, the focused graph representing the respective transaction defined by each transaction entry of the subgroup of transaction entries by (i) using the first graph style when the fraud indicator of that transaction entry indicates that the respective transaction is fraudulent and (ii) using the second graph style when the fraud indicator of that transaction entry indicates that the respective transaction is authentic, the ratio between the number of transactions represented using the first graph style to the number of transactions represented using the second graph style identifying the strength of the selection criteria for use in a fraud detection rule.

2. A method as in claim 1, further comprising:
while the general graph is provided on the electronic display of the user, receiving a focus command from the user, the focus command directing the processing circuitry to apply the set of selection criteria to the group of transaction entries to generate the subgroup of transaction entries.

3. A method as in claim 1 wherein providing the general graph on the electronic display includes:
displaying a first parallel coordinate plot on the electronic display to the user, the first parallel coordinate plot including (i) a series of vertical axes, each vertical axis identifying a respective transaction variable, and (ii) a first curve representing a first transaction defined by a first transaction entry, the first curve crossing each vertical axis at a first value corresponding to the set of transaction details of the first transaction entry.

4. A method as in claim 3 wherein the first transaction entry is included in the subgroup of transaction entries,
wherein the first parallel coordinate plot further includes a second curve representing a second transaction defined by a second transaction entry, the second curve crossing each vertical axis at a second value corresponding to the set of transaction details of the second transaction entry, the second transaction entry being excluded from the subgroup of transaction entries,
wherein providing the focused graph on the electronic display includes:
displaying a second parallel coordinate plot on the electronic display to the user, the second parallel coordinate plot including (i) the series of vertical axes, (ii) the first curve, and (iii) the second curve, the second curve being obscured relative to the first curve.

5. A method as in claim 4, wherein receiving the focus command from the user includes acquiring a user-specified range of a particular transaction variable, the first transaction entry having a value of the particular transaction variable within the user-specified range, the second transaction entry having a value of the particular transaction variable outside of the user-specified range, and
wherein applying the set of selection criteria to the group of transaction entries includes selecting those transaction entries having values of the particular transaction variable within the user-specified range to be included in the subgroup of transaction entries and selecting those transaction entries having values of the particular transaction variable outside of the user-specified range to be excluded from the subgroup of transaction entries.

6. A method as in claim 5, wherein the selection of the transaction entries having transaction variables with values within the user-specified range is performed in response to the user using an input device to drag a cursor on the electronic display over the user-specified range of the particular transaction variable along the vertical axis identifying the particular transaction variable.

7. A method as in claim 3, wherein displaying the first parallel coordinate plot on the electronic display includes normalizing a range of values of a transaction variable to take values between zero and one.

8. A computer program product including a non-transitory, computer-readable storage medium which stores executable code, which when executed by a computer, causes the computer to perform a method comprising:
from a group of transaction entries, providing a general graph on an electronic display of a user, the group of transaction entries defining a group of transactions,
each transaction entry including (i) a set of transaction details identifying aspects of a respective transaction and (ii) a fraud indicator indicating whether that respective transaction was fraudulent, and
the general graph representing the respective transaction defined by each transaction entry of the group of transaction entries by (i) using a first graph style when the fraud indicator of that transaction entry indicates that the respective transaction is fraudulent and (ii) using a second graph style when the fraud indicator of that transaction entry indicates that the respective transaction is authentic;
after providing the general graph on the electronic display of the user, applying selection criteria to the group of transaction entries to generate a subgroup of transaction entries from the group of transaction entries, the subgroup having fewer transaction entries than the group of transaction entries; and
from the subgroup of transaction entries, providing a focused graph on the electronic display of the user in place of the general graph, the focused graph representing the respective transaction defined by each transaction entry of the subgroup of transaction entries by (i) using the first graph style when the fraud indicator of that transaction entry indicates that the respective transaction is fraudulent and (ii) using the second graph style when the fraud indicator of that transaction entry indicates that the respective transaction is authentic, the ratio between the number of transactions represented using the first graph style to the number of transactions represented using the second graph style identifying the strength of the selection criteria for use in a fraud detection rule.

9. A computer program product as in claim 8, wherein the method further comprises:
while the general graph is provided on the electronic display of the user, receiving a focus command from the user, the focus command directing the processing circuitry to apply the set of selection criteria to the group of transaction entries to generate the subgroup of transaction entries.

10. A computer program product as in claim 8 wherein providing the general graph on the electronic display includes:
displaying a first parallel coordinate plot on the electronic display to the user, the first parallel coordinate plot including (i) a series of vertical axes, each vertical axis identifying a respective transaction variable, and (ii) a first curve representing a first transaction defined by a first transaction entry, the first curve crossing each vertical axis at a first value corresponding to the set of transaction details of the first transaction entry.

11. A computer program product as in claim 10 wherein the first transaction entry is included in the subgroup of transaction entries,     wherein the first parallel coordinate plot further includes a second curve representing a second transaction defined by a second transaction entry, the second curve crossing each vertical axis at a second value corresponding to the set of transaction details of the second transaction entry, the second transaction entry being excluded from the subgroup of transaction entries,     wherein providing the focused graph on the electronic display includes:

displaying a second parallel coordinate plot on the electronic display to the user, the second parallel coordinate plot including (i) the series of vertical axes, (ii) the first curve, and (iii) the second curve, the second curve being obscured relative to the first curve.

12. A computer program product as in claim 11, wherein receiving the focus command from the user includes acquiring a user-specified range of a particular transaction variable, the first transaction entry having a value of the particular transaction variable within the user-specified range, the second transaction entry having a value of the particular transaction variable outside of the user-specified range, and     wherein applying the set of selection criteria to the group of transaction entries includes selecting those transaction entries having values of the particular transaction variable within the user-specified range to be included in the subgroup of transaction entries and selecting those transaction entries having values of the particular transaction variable outside of the user-specified range to be excluded from the subgroup of transaction entries.

13. A computer program product as in claim 12, wherein the selection of the transaction entries having transaction variables with values within the user-specified range is performed in response to the user using an input device to drag a cursor on the electronic display over the user-specified range of the particular transaction variable along the vertical axis identifying the particular transaction variable.

14. A computer program product as in claim 10, wherein displaying the first parallel coordinate plot on the electronic display includes normalizing a range of values of a transaction variable to take values between zero and one.

15. An electronic apparatus comprising memory and controlling circuitry coupled to the memory, the controlling circuitry being constructed and arranged to:

from a group of transaction entries, provide a general graph on the electronic display of a user, the group of transaction entries defining a group of transactions,         each transaction entry including (i) a set of transaction details identifying aspects of a respective transaction and (ii) a fraud indicator indicating whether that respective transaction was fraudulent, and         the general graph representing the respective transaction defined by each transaction entry of the group of transaction entries by (i) using a first graph style when the fraud indicator of that transaction entry indicates that the respective transaction is fraudulent and (ii) using a second graph style when the fraud indicator of that transaction entry indicates that the respective transaction is authentic;

after providing the general graph on the electronic display of the user, apply selection criteria to the group of transaction entries to generate a subgroup of transaction entries from the group of transaction entries, the subgroup having fewer transaction entries than the group of transaction entries; and     from the subgroup of transaction entries, provide a focused graph on the electronic display of the user in place of the general graph, the focused graph representing the respective transaction defined by each transaction entry of the subgroup of transaction entries by (i) using the first graph style when the fraud indicator of that transaction entry indicates that the respective transaction is fraudulent and (ii) using the second graph style when the fraud indicator of that transaction entry indicates that the respective transaction is authentic, the ratio between the number of transactions represented using the first graph style to the number of transactions represented using the second graph style identifying the strength of the selection criteria for use in a fraud detection rule.

16. An electronic apparatus as in claim 15, wherein the controlling circuitry is further constructed and arranged to:

while the general graph is provided on the electronic display of the user, receive a focus command from the user, the focus command directing the processing circuitry to apply the set of selection criteria to the group of transaction entries to generate the subgroup of transaction entries.

17. An electronic apparatus as in claim 15, wherein the controlling circuitry constructed and arranged to provide the general graph on the electronic display is further constructed and arranged to:

display a first parallel coordinate plot on the electronic display to the user, the first parallel coordinate plot including (i) a series of vertical axes, each vertical axis identifying a respective transaction variable, and (ii) a first curve representing a first transaction defined by a first transaction entry, the first curve crossing each vertical axis at a first value corresponding to the set of transaction details of the first transaction entry.

18. An electronic apparatus as in claim 17 wherein the first transaction entry is included in the subgroup of transaction entries,     wherein the first parallel coordinate plot further includes a second curve representing a second transaction defined by a second transaction entry, the second curve crossing each vertical axis at a second value corresponding to the set of transaction details of the second transaction entry, the second transaction entry being excluded from the subgroup of transaction entries,     wherein the controlling circuitry constructed and arranged to provide the focused graph on the electronic display is further constructed and arranged to:

display a second parallel coordinate plot on the electronic display to the user, the second parallel coordinate plot including (i) the series of vertical axes, (ii) the first curve, and (iii) the second curve, the second curve being obscured relative to the first curve.

19. An electronic apparatus as in claim 18, wherein the controlling circuitry constructed and arranged to receive the focus command from the user is further constructed and arranged to acquire a user-specified range of a particular transaction variable, the first transaction entry having a value of the particular transaction variable within the user-specified range, the second transaction entry having a value of the particular transaction variable outside of the user-specified range, and wherein applying the set of selection criteria to the group of transaction entries includes selecting those transaction entries having values of the particular transaction variable within the user-specified range to be included in the subgroup of transaction entries and selecting those transaction entries having values of the particular transaction variable outside of the user-specified range to be excluded from the subgroup of transaction entries.

20. An electronic apparatus as in claim 19, wherein the selection of the transaction entries having transaction variables with values within the user-specified range is performed in response to the user using an input device to drag a cursor on the electronic display over the user-specified range of the particular transaction variable along the vertical axis identifying the particular transaction variable.

\* \* \* \* \*